(12) United States Patent
Ganguly et al.

(10) Patent No.: US 9,606,244 B2
(45) Date of Patent: Mar. 28, 2017

(54) X-RAY IMAGER WITH LENS ARRAY AND TRANSPARENT NON-STRUCTURED SCINTILLATOR

(71) Applicant: Varian Medical Systems, Inc., Palo Alto, CA (US)

(72) Inventors: Arundhuti Ganguly, San Jose, CA (US); Ivan Mollov, Mountain View, CA (US)

(73) Assignee: Varex Imaging Corporation, Salt Lake City, UT (US)

( * ) Notice: Subject to any disclaimer, the term of this patent is extended or adjusted under 35 U.S.C. 154(b) by 143 days.

(21) Appl. No.: 14/207,506

(22) Filed: Mar. 12, 2014

(65) Prior Publication Data

US 2014/0264043 A1    Sep. 18, 2014

Related U.S. Application Data

(60) Provisional application No. 61/785,262, filed on Mar. 14, 2013.

(51) Int. Cl.
*G01T 1/20* (2006.01)
*G01T 1/202* (2006.01)

(52) U.S. Cl.
CPC .......... *G01T 1/2006* (2013.01); *G01T 1/2018* (2013.01)

(58) Field of Classification Search
CPC .............................. G01T 1/2006; G01T 1/2018
See application file for complete search history.

(56) References Cited

U.S. PATENT DOCUMENTS

| 5,617,463 | A | * | 4/1997 | Beierlein | G01T 1/2018 348/E5.086 |
| 6,472,665 | B1 | * | 10/2002 | Ishisaka | G01T 1/2018 250/368 |
| 6,744,052 | B1 | * | 6/2004 | Petersson | G01T 1/2018 250/361 R |
| 2001/0000972 | A1 | * | 5/2001 | Haba | G02B 27/283 353/34 |
| 2002/0034014 | A1 | * | 3/2002 | Gretton | G02B 3/0012 359/619 |
| 2004/0251419 | A1 | * | 12/2004 | Nelson | G01T 1/243 250/370.09 |
| 2005/0167605 | A1 | * | 8/2005 | Juni | G01T 1/20 250/370.11 |

(Continued)

FOREIGN PATENT DOCUMENTS

WO    WO 0237139 A1 * 5/2002 ........... G01T 1/2018

OTHER PUBLICATIONS

Evrad et al., A novel photodiode array structure for gamma camera applications, May 2003, Proceedings on the 3rd International Conference on New Developments in Photodetection, vol. 504, Iss. 1-3, pp. 188-195.*

(Continued)

*Primary Examiner* — David Porta
*Assistant Examiner* — Jeremy S Valentiner
(74) *Attorney, Agent, or Firm* — Houst Consulting

(57) ABSTRACT

An x-ray imager includes a scintillator layer configured to generate light from x-rays, a detector array configured to detect light generated in the scintillator layer, and a lens array situated between the scintillator layer and the detector array. The lens array may be configured to collect light and focus the collected light to the detector array.

29 Claims, 2 Drawing Sheets

(56) References Cited

U.S. PATENT DOCUMENTS

| | | | | |
|---|---|---|---|---|
| 2005/0285044 | A1* | 12/2005 | Mollov | G01T 1/24 |
| | | | | 250/370.11 |
| 2006/0044433 | A1* | 3/2006 | Akram | H01L 27/14618 |
| | | | | 348/294 |
| 2006/0138335 | A1* | 6/2006 | Vogtmeier | G01T 1/2018 |
| | | | | 250/370.11 |
| 2006/0202128 | A1* | 9/2006 | Berger | G01T 1/2002 |
| | | | | 250/370.11 |
| 2008/0152087 | A1* | 6/2008 | Tseng | G01T 1/20 |
| | | | | 378/98.3 |
| 2008/0179533 | A1* | 7/2008 | Nagata | G01T 1/2002 |
| | | | | 250/370.11 |
| 2010/0270462 | A1* | 10/2010 | Nelson | G01T 1/2018 |
| | | | | 250/252.1 |
| 2011/0017911 | A1* | 1/2011 | Flamanc | C09D 7/1216 |
| | | | | 250/361 R |

OTHER PUBLICATIONS

Berkel et al., Microlens arrays for 2D large area image sensors, Pure Appl. Opt. 3 (1994) 177-182.
Kim et al., Nuclear Instruments and Methods, Physics Research A 610 (2009) 317-320.

* cited by examiner

X-RAY IMAGER WITH LENS ARRAY AND TRANSPARENT NON-STRUCTURED SCINTILLATOR

TECHNICAL FIELD

Embodiments of this disclosure relate to x-ray imaging devices and methods. In particular, an x-ray imaging device and method using a lens array to collect light from x-ray scintillators and deposit the collected light onto a detector array are described.

BACKGROUND

Digital x-ray imagers are rapidly replacing x-ray film based detectors in medical imaging and other applications. In a digital x-ray imager, the x-ray signal is converted into either light photons or charge carriers, which are then collected and converted to a measurable electrical signal and digitized by an electronic circuit. The digitized signal is then represented as a discrete grayscale level in an image pixel. A matrix of such grayscale pixels forms an x-ray image. For imagers in which x-rays are first converted into light, a scintillator material is used. The scintillator material generates optical light photons when x-rays are stopped by and interact with the scintillator material. Photosensitive elements such as photodiodes collect light from the scintillator. The total amount of light collected by a photosensitive element affects the image signal and noise levels. The spread of the light determines the optical blur in the image. This, together with the detector pixel size determines the image resolution and is measured in terms of modulation transfer function (MTF).

In conventional imagers for low energy (KV) x-ray imaging, the scintillators are grown as columnar needles of about 10 μm diameter that act as light pipes or guides. However, there is still significant cross talk between neighboring scintillator needles. For higher energy (MV) imaging, significantly thicker scintillators are needed to stop the x-rays. Growing very thick structured needles is difficult and its effectiveness to channel light reduces as cross talk increases.

Conventional MV x-ray imaging or electronic portal imaging devices (EPID) suffer from low detective quantum efficiency (DQE). DQE is a measure of the fidelity of an imaging device in capturing and transferring image information. The range of DQE is 0<DQE<1, where the value of 1 implies that all the image information in the incoming X-rays is captured and no noise is added. Portal imagers are typically used at high energies such as MV and hence require thick scintillators to effectively absorb x-rays. The absorbed x-rays then generate optical photons at the location of their interaction. The optical photons that are generated travel in all directions and can be further reflected and/or refracted from interfaces. The light photons that can reach the photodiodes form the final image. With increased thickness of the scintillator, the light photons undergo extensive spreading and result in image blurring.

To overcome the above problems in MV x-ray imaging, pixellated scintillators have been used. Pixellated scintillators are formed by slicing the scintillator crystal into parallelepipeds, which are then coated with a layer of reflective or absorptive coating. The coated parallelepipeds are then joined back together, with the reflective or absorptive layer sandwiched between adjacent pieces. A pixellated scintillator may limit the spread of light but manufacturing such a matrix is labor intensive and the cost for large area pixellated scintillators is prohibitive. Further, the partition between neighboring pixels may cause light to bounce back into the scintillator pixel and as such, the original directionality of the light ray is lost.

Accordingly, there is a general need for improving the resolution of imaging devices for both KV and MV x-ray imaging. There is a need for an x-ray imaging device and method that can reduce the effect of light spreading in scintillators particularly in configurations where conventional approach results in heavy light losses and high costs.

SUMMARY

In an exemplary embodiment, an x-ray imager comprises a scintillator layer configured to generate light from x-rays, a detector array configured to detect light generated in the scintillator layer, and a lens array situated between the scintillator layer and the detector array and configured to collect light and focus collected light to the detector array. The scintillator layer may be non-pixellated and/or non-structured.

In another exemplary embodiment, an x-ray imager comprises a scintillator layer, a detector array configured to detect light generated in the scintillator, and a lens array situated between the scintillator and the detector. For every lens in the lens array there is a group of multiple detector elements placed in a way to receive light from different directions within the volume of the scintillator. Information received by the different detectors in the group is used to reconstruct images at different planes within the volume of the scintillator. These images correspond to x-ray photons that have different energies entering the scintillator and can provide valuable information about the composition of the materials that are being imaged.

This Summary is provided to introduce selected embodiments in a simplified form and is not intended to identify key features or essential characteristics of the claimed subject matter, nor is it intended to be used as an aid in determining the scope of the claimed subject matter. Other embodiments of the disclosure are further described in the Detail Description.

BRIEF DESCRIPTION OF THE DRAWINGS

These and other features and advantages of the disclosed methods and apparatuses will become better understood upon reading of the following detailed description in conjunction with the accompanying drawings and the appended claims provided below, where:

DETAILED DESCRIPTION

Figure 1:
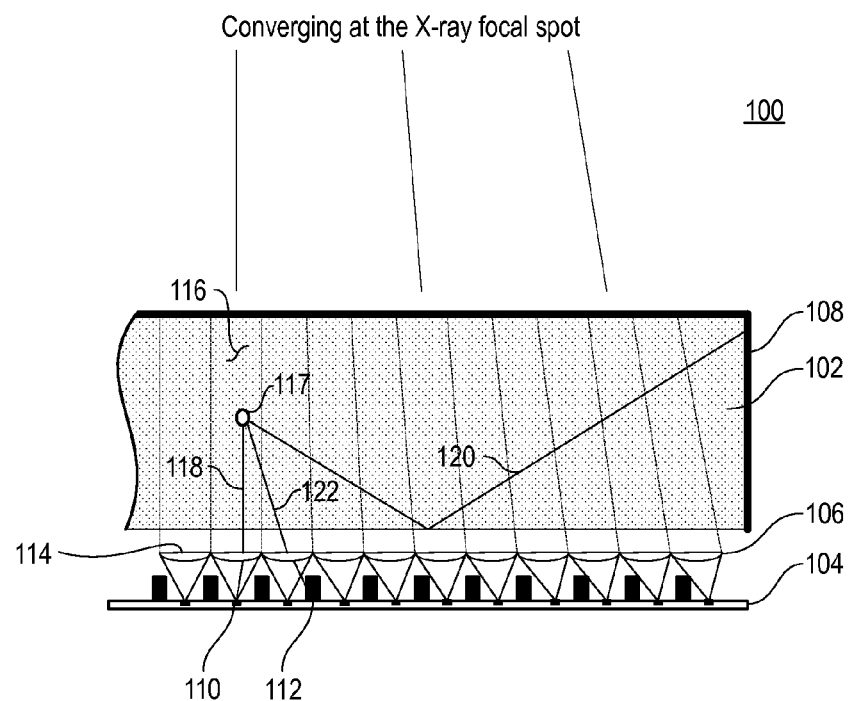
FIG. 1 is a schematic partial view of an exemplary x-ray imager according to some embodiments of this disclosure.

Various embodiments of methods and devices for x-ray imaging are described. It is to be understood that the disclosure is not limited to the particular embodiments described as such may, of course, vary. An aspect described in conjunction with a particular embodiment is not necessarily limited to that embodiment and can be practiced in any other embodiments. Further, in the following description, numerous specific details such as examples of specific components, dimensions, processes, etc. may be set forth in order to provide a thorough understanding of the disclosure. It will be apparent, however, to one of ordinary skill in the art that these specific details need not be employed to practice embodiments of the disclosure. In other instances, well known components or steps may not be described in detail in order to avoid unnecessarily obscuring the embodiments of the disclosure.

Various relative terms such as "above," "below," "top," "bottom," "height," "depth," "width," and "length," etc. may be used to facilitate description of various embodiments. The relative terms are defined with respect to a conventional orientation of a structure and do not necessarily represent an actual orientation of the structure in manufacture or use. The following detailed description is, therefore, not to be taken in a limiting sense. As used in the description and appended claims, the singular forms of "a," "an," and "the" may include plural references unless the context clearly dictates otherwise.

As used herein, the term "structured scintillator" refers to a scintillator that has a columnar structure. A structured scintillator may include a plurality of long needle-like towers or columns which may act as light pipes channeling light emitted within them toward the detector array to reduce the lateral spread of light. As used herein, the term "non-structured scintillator" refers to a scintillator that does not have a columnar or needle-like structure. A non-structured scintillator is substantially transparent to visible light in all directions.

As used herein, the term "pixellated scintillator" refers to a scintillator comprising a plurality of scintillator parallelepipeds or single scintillator crystals that are coated with a layer of reflective or absorptive coating. A reflective or absorptive wall is sandwiched between neighboring parallelepipeds or single scintillator crystals, which may prevent light from reaching neighboring pixels. As used herein, the term "non-pixellated scintillator" refers to a scintillator that does not have parallelepipeds or single scintillator crystals coated with a layer of reflective or absorptive coating.

As used herein, the term "reverse configuration" refers to a configuration of an x-ray imager wherein a detector array is situated between an x-ray source and an x-ray scintillator layer. When an x-ray imager of a reverse configuration is in use, x-rays traverse the detector array before propagating in the scintillator layer. The term "forward configuration" refers to a configuration of an x-ray imager wherein an x-ray scintillator layer is situated between an x-ray source and a detector array. When an x-ray imager of a forward configuration is in use, x-rays are incident on the scintillator layer before propagating in the detector array.

An x-ray imager is provided in this disclosure. The x-ray imager may comprise a scintillator layer configured to generate light from x-rays, a detector array configured to detect light generated in the scintillator layer, and a lens array situated between the scintillator layer and the detector array. The lens array may be configured to collect light and focus collected light to the detector array.

The scintillator layer may be non-pixellated or non-structured. Suitable scintillator materials include but are not limited to: gadolinium oxisulfide ($Gd_2O_2S$:Tb), cadmium tungstate ($CdWO_4$), bismuth germanate ($Bi_4Ge_3O_{12}$ or BGO), cesium iodide (CsI), etc.

The detector array may include a plurality of detector elements configured to generate electric signals in response to the light produced in the scintillator layer. Each detector element may include a photosensitive element to convert light into electrical charges, may include a switching element to access the electrical charges by readout electronics and may include signal amplifying circuit. The photosensitive element may be a photodiode, a photoconductor, a photogate, or a phototransistor etc. The switching element may be a thin film transistor (TFT) other switching elements such as organic transistors, charge coupled devices (CODs), CMOS, metal oxide transistors, or transistors made of other semiconductor materials, and/or switching diodes. The TFTs may be amorphous silicon (a-Si), metal oxide or polycrystalline silicon TFTs. The photosensitive elements and switching elements may be formed on a substrate by any methods known in the art, and thus their detail description is omitted here in order to avoid unnecessarily obscuring the description of the embodiments of this disclosure. Optionally the detector elements may contain other components for signal or charge buffering and amplification. The signal from each detector element may define the value of a corresponding pixel of the X-ray image generated using the x-ray imager. The detector array may also include a pixel access circuit, which may be configured to access the detector elements and reads the electric signals from the detectors. The process of accessing detector elements and reading electric signals therefrom is known to those skilled in the art.

The lens array may comprise a plurality of lenses. Each of the lenses may be configured to collect light and focus the collected light to one of the plurality of photosensitive elements of the detector array.

The lenses may comprise an anti-reflective coating to improve light collecting property of the lenses. The lens array may be glued to the scintillator layer or to the detector array. Alternatively, the lens array may be glued to both the scintillator layer and the detector array.

The lens array may comprise multiple lens layers. The size of each lens may be greater than the size of a photosensitive element covered by the lens. The lenses may have their curved sides pointing toward the scintillator layer or pointing toward the detector array. The lenses may also have both surfaces curved. The lenses may also have a planar surface facing either to the detector array or the scintillator layer. When the lenses have their flat surface facing the scintillator layer it will decrease the light acceptance angle and help reject unwanted light not generated in front of the lens.

The plurality of lenses may define a plurality of virtual optical paths in the scintillator layer. Each of the plurality of virtual optical paths may correspond to one of the plurality of photosensitive elements in the detector array. The numerical aperture, the focal plane location, and the orientation of the solid angle of acceptance of the lenses can be chosen such that light that is generated in a virtual optical path and travels within the path is collected by the corresponding lens and deposited to the corresponding photosensitive element. Light that is generated in a virtual optical path but escapes out of the optical path, while incident on the lens array, may be prevented from depositing to a neighboring photosensitive element by placing a light blocker in the space between adjacent photosensitive elements. The light blocker may occupy a substantial part of the volume between the photosensitive elements that is outside of the optical paths or have a different construction to perform the same function. This arrangement may improve the resolution of the x-ray imager by preventing stray light from depositing to neighboring photosensitive elements.

The virtual optical paths defined by the lenses in the scintillator layer preferably converge substantially at the focal spot of an x-ray source. The light collected by each lens is generated within a virtual path or virtual cylinder. By proper selection of the lens location and focusing properties, these virtual cylinders can be angled so that they converge to a central location. This may be achieved by having the lenses and the detectors at a different array pitch.

The scintillator comprises a first surface proximal to the lens array, a second surface distal to the lens array, and side surfaces. In some embodiments, the first surface may be polished. In some embodiments, the second surface may be further covered with a reflective coating and the side surfaces are covered with a light absorbing material. Alternatively, the first surface may be covered with an antireflective coating. In some embodiments, the second surface and side surfaces may further be covered by an antireflective coating.

The scintillator layer, the detector array, and the lens array may be arranged in a forward configuration, i.e. the scintillator layer is situated between an x-ray source and the detector array, such that when in use x-rays are incident on the scintillator layer before propagating in the detector array. Alternatively, the scintillator layer, the detector array, and the lens array of the disclosed imager may be arranged in a reverse configuration, i.e., the detector array is situated between an x-ray source and the scintillator layer, such that when in use x-rays traverse the detector array first before propagating in the scintillator layer.

In some embodiments, the disclosure provides an x-ray imager comprising a scintillator layer configured to generate light from x-rays and a detector array comprising a plurality of photosensitive elements configured to detect light generated in the scintillator layer. The scintillator layer may be non-pixellated or non-structured. The scintillator layer has a first surface proximal to the detector array. The first surface of the scintillator layer may be shaped like a lens array. For example, the first surface of the scintillator layer may comprise a plurality of portions, each having a curved surface facing toward one of the plurality of photosensitive elements. The curved surface may be convex pointing toward one of the plurality of the photosensitive elements. The pattern of the first surface of the scintillator layer can be created by grinding, milling, chemical processing, thermal processing, photo-lithography or by growing the scintillator crystal on a pre-patterned substrate. The first surface of the scintillator layer may have a lens pattern with suitable focal length and aperture.

In some further embodiments, the disclosure provides an x-ray imager which comprises a scintillator layer configured to generate light from x-rays, a detector array configured to detect light generated in the scintillator layer, and a lens array situated between the scintillator layer and the detector array. The detector array may comprise a plurality of groups of photosensitive elements and each group may comprise at least a first photosensitive element and a second photosensitive element. The lens array may comprise a plurality of lenses and each lens may cover one of the plurality of groups of photosensitive elements. Each photosensitive element from the group defines a separate and unique optical path through the respective lens and through the scintillator. Every photosensitive element in the group receives light from different direction in the volume of the scintillator at the same time. The signal level of the different photo-sensors may be used to reconstruct the light generated in the volume of the scintillator at different planes. The light at different planes of the scintillator is produced by x-ray photons with different energies, which may be used to differentiate the materials in the x-ray beam which is imaged. A common image processing for reconstruction of such image planes is called tomographic synthesis.

The scintillator layer may be non-pixellated or non-structured. The scintillator layer, the detector array, and the lens array may be arranged in a reverse configuration such that x-rays traverse the detector array before propagating in the scintillator layer. The scintillator layer, the detector array, and the lens array may also be arranged in a forward configuration such that x-rays are incident on the scintillator layer before propagating in the detector array.

A multi-energy imaging method is provided in this disclosure. It is known that x-rays are stopped or attenuated by different material differently. The attenuation depends on the energy of the x-ray, the material composition, and the material thickness. This is described by the Beer's law:

$$I_{out} = I_{in} e^{-\mu(E) x}$$

where $\mu(E)$ is the energy dependent attenuation coefficient and x is the thickness of the material. Therefore, in a layer of x-ray attenuating material, relatively more of the lower energy x-ray photons may be stopped closer to the entrance surface, and higher energy x-ray photons may travel deeper and relatively (to the low energy photons) more of them deposit their energy closer to the exit surface. In a layer of a scintillator material, x-rays of different energy would generate light at different depths. By identifying light from different depths of the same scintillator and creating corresponding images, energy dependent x-ray imaging can be performed.

An x-ray beam used in imaging typically consists of a broad spectrum of x-ray energies. Using the concept of depth dependent x-ray absorption described above, images at multiple energies can be generated from a single x-ray exposure. Currently, multi-energy images are typically obtained with multiple x-ray exposures at multiple energies instead of splitting energies in the scintillator as described above. Energy dependent images have different information content that can be useful. In medical imaging lower energy images have more soft tissue information and better contrast. Higher energy images have more bone information. By looking at these images separately or in combination, additional information can be obtained. A common example is dual energy imaging that suppresses or highlights bone or soft tissue alternatively.

Accordingly, this disclosure provides a method of acquiring x-ray images using a pulse of x-rays having high and low energy portions. In the provided method, a pulse or continuous x-rays are passed through an object and received by an x-ray imager. The x-ray imager may comprise a scintillator layer, a lens array and a detector array. The x-rays received by the imager may represent x-ray signals indicating a structure of an object being imaged. The x-rays may have an energy spectrum including a first energy portion and a second energy portion. The terms "first" and "second" are used herein for ease of description of the embodiments. It should be noted the x-ray energy spectrum may have more than two portions and there might be more than two planes of the scintillator corresponding to more than two energy portions. Because x-rays of different energies have different absorption profiles in the scintillator, light may be generated in a first plane of the scintillator from x-rays of the first energy portion and in a second plane of the scintillator layer from x-rays of the second energy portion. Light generated in the first plane of the scintillator and light generated in the second plane of the scintillator are collected by the lens array respectively. In one embodiment, the detector array may comprise a plurality of groups of photosensitive elements, each group comprising at least a first photosensitive element and a second photosensitive element. The lens array may comprise a plurality of lenses, each lens covering one of the plurality of groups of photosensitive elements. A first photosensitive element in each group may receive light from a first optical path and a second photosensitive element in each group may receive light from a second optical path. The plurality of first and the second photosensitive elements in the plurality of groups can be arranged such that their respective optical paths cross the volume of the scintillator at different angles traversing areas of the scintillator in front of different lenses and groups of photo sensitive elements. In post image processing, a first image may be constructed by using data from the plurality of first photosensitive elements of the plurality of groups or a second image may be constructed by using data from the plurality of second photosensitive elements of the plurality of groups. A third image may be computed from the first and second images by using image processing algorithms known in the art.

Exemplary embodiments will now be described with reference to the figures. It should be noted that figures are not necessarily drawn to scale and some well known components may not be shown. The figures are only intended to facilitate the description of specific embodiments, and are not intended as an exhaustive description or as a limitation on the scope of the disclosure.

FIG. 1 schematically shows an x-ray imager 100 according to some embodiments of this disclosure. The x-ray imager 100 may include a scintillator layer 102, a detector array 104, and a lens array 106 situated between the scintillator layer 102 and the detector array 104.

The scintillator layer 102 may be configured to generate light from x-rays. Any suitable scintillator materials may be used. Suitable scintillator materials include and are not limited to gadolinium oxisulfide ($Gd_2O_2S$:Tb), cadmium tungstate ($CdWO_4$), bismuth germanate ($Bi_4Ge_3O_{12}$ or BGO), or cesium iodide (CsI), or any combination thereof.

In some embodiments, the scintillator layer 102 may be non-pixellated and non-structured. A clear or continuous crystal structure may be advantageous in that it reduces the cost of making x-ray imagers. Growing a thick crystal columns or needles can be difficult and its effectiveness to channel light is limited as cross talk increases. Manufacturing a pixellated scintillator matrix is also labor intensive and the cost for large area pixellated scintillators can be prohibitive. Another advantage of using clear or continuous scintillator crystal in conjunction with a lens array is that it allows multi-energy imaging from a single x-ray exposure, as will be described in more detail below. The pixellated crystal may cause light to bounce on the partition wall between neighboring crystal pieces and as such, the light ray loses its original directionality. This then prevents the possibility for multi-energy imaging since the tomographic approach requires accurate ray-tracing capability. While clear or continuous scintillator crystal may be preferred in some embodiments of this disclosure, structured or pixellated scintillators may be used in alternative embodiments.

The scintillator layer 102 may be covered with a light absorbing coating 108 on all sides except for the side proximal and facing the detector array. Stray light 120 that travels to the light absorbing surfaces 108 may be absorbed and thus prevented from bouncing back. In some embodiment, the surface of the scintillator, opposite to the lens array may be covered by a reflective layer (mirror). In this case care should be taken for the two surfaces of the scintillator to be parallel to each other. In some embodiments, the surface of the scintillator opposite to the lenses may be polished to reflect light back to the lenses. The polished surface or reflective layer construction may double the usable light and may be useful in embodiments where the optical paths in the scintillator layer are parallel and/or thinner scintillators are used.

The scintillator layer 102 may have a thickness chosen depending on application requirements. For lower energy imaging e.g. keV x-ray imaging, the thickness of the scintillator layer may range from 50 um to 5 mm. For higher energy imaging e.g. MV x-ray imaging, the thickness of the scintillator layer may range from 1 mm to 100 mm.

The detector layer 104 may be configured to detect light generated in the scintillator layer 102. The detector layer 104 may comprise an array of detector elements. Each of the detector elements may include a photosensitive element 110 configured to convert light into electrical signals. Each of the detector elements may include a switching element configured to access the electrical signals by readout electronics. The components of a detector element, including the photosensitive element and switching element, and their method of fabrication are well known in the art and thus their detail description is omitted here in order to facilitate description of embodiments of this disclosure. The detector array 104 may optionally include a plurality of light blockers or separators 112. Each of the light blockers 112 may be placed between two adjacent photosensitive elements 110. The light blockers 112 may be made of light absorbing materials that absorb light and thus help prevent escape light 122 incident on the lens array from getting into neighboring photosensitive elements. In some embodiments, the light blockers 112 may have different shape and configuration than the one shown in the figure. In some embodiments, the light blockers 112 may fill up substantially all the space outside the optical path of every photosensitive element 110.

The lens layer 106 may be configured to collect light produced in the scintillator layer 102 and focus the collected light to corresponding photosensitive elements 110. The lens array 106 may be situated between the scintillator layer 102 and the detector layer 104.

The lens array 106 may comprise a plurality of lenses 114. In some embodiments, the number of lenses 114 may be same as the number of photosensitive elements 110 such that each lens 114 may cover one of the photosensitive elements 110. Each individual lens 114 may be configured to focus at one photosensitive element 110. The lenses may be arranged in rows and columns or other patterns forming a 2D array corresponding to a 2D detector array. The lenses may also be arranged in a 1D array corresponding to a 1D detector array.

Lens arrays and methods of making lens arrays are known in the art, and thus detail description of making the lens array is omitted herein to avoid obscuring the description of embodiments of this disclosure. In general, lens arrays can be fabricated using reflow techniques. Multiple lenses can be formed in a one-dimensional or two-dimensional array on a supporting substrate. Lenses with lens diameters ranging from about 10 microns to few millimeters and with various numerical apertures and focal lengths can be made. Lens array with two or more lens layers can also be made. The individual lenses may have a circular, square, or other regular or irregular shape on the supporting substrate. Between neighboring lenses there can be a gap or no gap. Fill-factor refers to the ratio of the active refracting area of the lenses, i.e. the area which directs light to the photosensitive elements, to the total contiguous area occupied by the lens array.

Figures 2A, 2B:
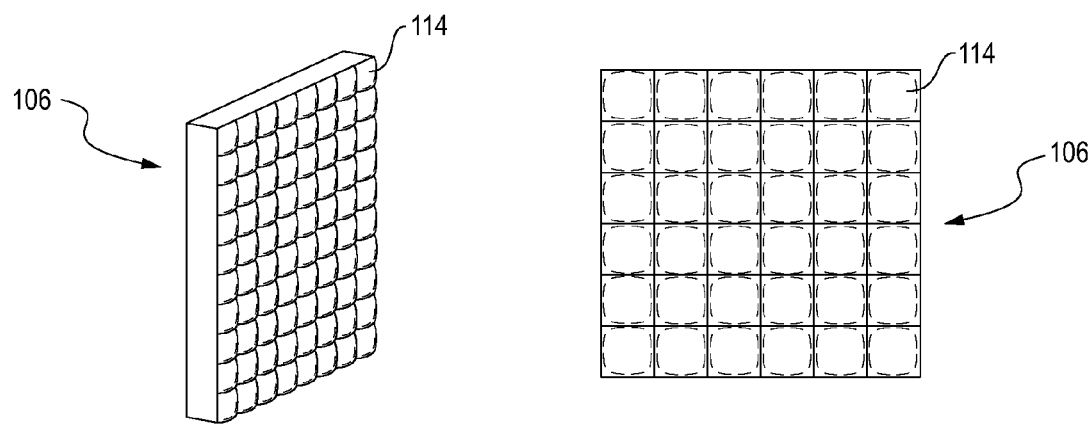
FIGS. 2A and 2B schematically show an exemplary lens array that can be implemented in the x-ray imager according to embodiments of this disclosure.

FIGS. 2A and 2B schematically show an exemplary lens array 106 that can be used in the x-ray imagers 100 described in this disclosure. The lens array 106 may have a large fill factor such as a fill factor greater than 90%. The lenses 114 may have a generally square configuration and a curved surface. Lens arrays with other lens shapes or configurations and fill factors may also be used in the disclosure. The lenses can be made of any suitable materials optically transparent to the light generated in the scintillator. Suitable materials include glasses and plastics.

The lens array 106 can be affixed directly to the scintillator layer 102. The lens array 106 may also be affixed directly to the detector array 104. Alternatively, the lens array 106 may be affixed to both the scintillator layer 102 and the detector array 104. Various techniques known in the art including reference markers can be used to ensure proper alignment between the lens array 106 and detector array 104.

The lenses 114 may have their curved surfaces or sides pointing toward the detector array 104 as shown in FIG. 1. The lenses 114 may also have their curved sides pointing toward the scintillator layer 102. Alternatively, the lenses 114 may have both surfaces curved, or have one surface curved and the other surface planar (piano-convex). A lens array having lens planar surfaces facing the scintillator layer may decrease the light acceptance angle and help reject unwanted light not generated in front of the lens. The lenses 114 may be covered with an anti-reflective coating to improve the lens light collecting and focusing performance.

In some embodiments, the optical paths of the lenses may converge at the x-ray source. The convergence of the optical paths towards the X-ray focal spot can be achieved by making the pitch of the lenses and the pitch of the photo sensors different. For an imager with the forward construction, the photo sensor pitch may be bigger than the pitch of the lenses. For an imager with the reverse construction, the pitch of the lenses may be bigger than the photo sensor pitch. The lenses or the photo sensors may have a constant but different pitch. In alternative embodiments, the pitch of the lenses and the sensors may be the same. As such, there would be no convergence towards a single point and all optical paths would be parallel. This construction may be useful in embodiments where thinner scintillators are used. The photo sensors may receive light generated in every plane of the scintillator. Each photo sensor within a group that corresponds to a lens may have a different optical path. The photo sensors within each group may have different pitch in order to optimize each photo sensor optical path within the volume of the scintillator. By choosing different photo sensors within each group, an image processing device can reconstruct the images at different planes of the scintillator as will be described in greater detail below.

In some embodiments, the photo sensors may have a size smaller than that of the lenses. In some embodiments, the actual photo sensors may be relatively large but an opaque mask with small transparent areas (holes), smaller than the photo sensor, can be placed between the lenses and photo sensors. The small holes in the mask can be positioned in front of each sensor. The plane of the mask may be located at or near the focal plane of the lenses. The pitch of the holes may be substantially the same as the pitch of the photo sensors. In some embodiments the pitch of the photo sensors may be constant, but the pitch of the holes may be different within a group of photosensors corresponding to each one of the lenses.

In some embodiments, the imager 100 may further include an optical grid (not shown in FIG. 1) placed between the scintillator layer 102 and the lens array 106. The optical grid may be thin sheets of light absorbing material rising up from the periphery of each of the lenses.

The x-ray imager 100 shown in FIG. 1 is in a forward configuration where the scintillator layer 102 is situated between an x-ray source (above the scintillator layer) and the detector layer 104. In alternative embodiments, the x-ray imager may also be in a reverse configuration where an x-ray source would be placed below the detector array, i.e., the detector array would be situated between the scintillator layer and an x-ray source.

The x-ray imager 100 shown in FIG. 1 includes a lens array 106 situated between the scintillator layer 102 and the detector array 104. Alternatively, the x-ray imager may not need to include a separate lens array. The scintillator layer in the x-ray imager may have a surface patterned like a lens array and additionally function as a lens layer. For example, the first surface of the scintillator layer may comprise a plurality of portions, each having a curved surface facing toward one of the plurality of photosensitive elements. The curved surface may be convex pointing toward one of multiple photosensitive elements. The curved surface may be concave facing one of multiple photosensitive elements. A scintillator layer having a surface with a pattern of a lens array can be made by grinding, milling, etching, or by growing the scintillator crystal on a pre-patterned substrate. Suitable focal lengths and apertures can be provided by patterning the first surface of the scintillator layer.

In operation, divergent x-rays may be incident on the scintillator layer 102. Light may be generated at a point e.g. 117 in the scintillator layer 102 as a result of interaction of x-rays with the scintillator. The generated light may travel in any directions. For example, it may travel along the virtual optical path defined by a numerical aperture of a corresponding lens, be reflected, or escape following refraction. For example, light 118 traveling in a virtual optical path 116 may be collected and directed to a corresponding photosensitive element 110, which may convert the light to electrical signals. Light 120 that is reflected and travels to the other surfaces may be absorbed by the light absorbing coating 108. The light 122 escaping the virtual optical path 116 may be incident on the lens array 106. By choosing the numerical aperture, the focal plane location, and the orientation of the solid angle of acceptance of the lenses 114, the escaping light 122 may be prevented from going into the photosensitive elements 110, so that lights traveling within the virtual optical path of a particular lens are preferentially received by the corresponding photosensitive element. The light blockers or separators 112 placed between adjacent photosensitive elements 110 may further help reject the stray light. As a result, resolution losses from spreading of light in the scintillator can be recovered and noise can be reduced.

Figure 3A:
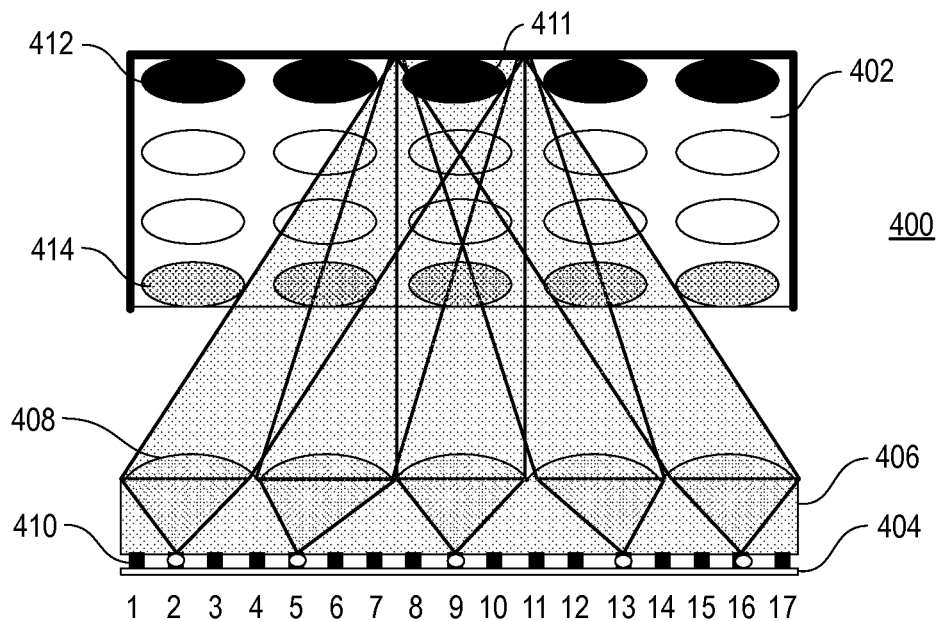
FIGS. 3A and 3B are schematic views of an exemplary x-ray imager according to some other embodiments of this disclosure.
Figure 3B:
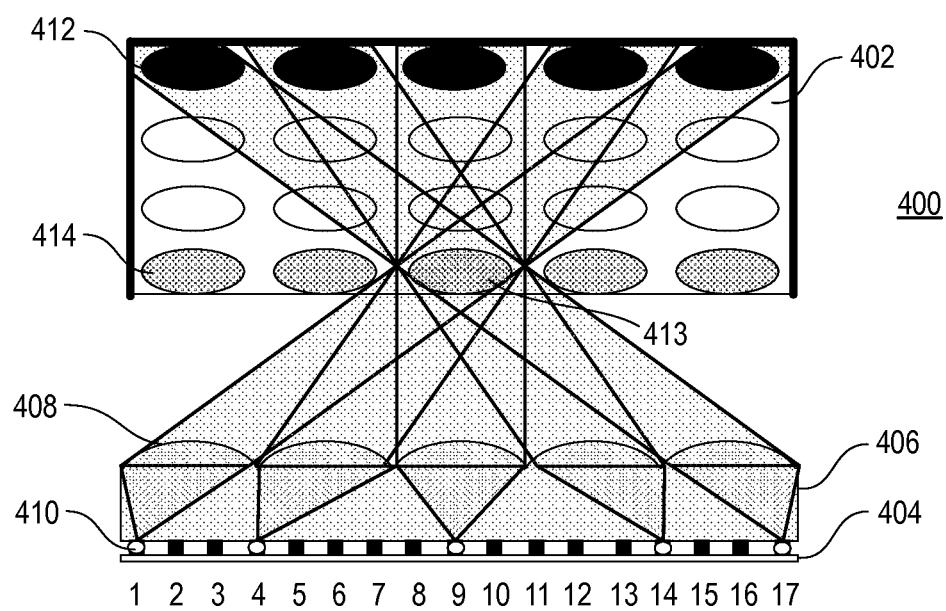

FIGS. 3A and 3B schematically show an x-ray imager 400 according to some other embodiments of this disclosure. The x-ray imager 400 shown in FIGS. 3A and 3B is similar to the imager 100 shown in FIG. 1 in many aspects. The x-ray imager 400 may comprise a scintillator layer 402 configured to generate light from x-rays, a detector array 404 configured to detect light generated in the scintillator layer 402, and a lens array 406 situated between the scintillator layer 402 and the detector array 404 and configured to collect light and focus the collected light to the detector array 404. Unlike the x-ray imager 100 shown in FIG. 1, each lens 408 of the lens array 406 in imager 400 shown in FIGS. 3A-3B may cover multiple or a group of photosensitive elements 410. For clarity of description of the embodiment, the multiple photosensitive elements in a group may be referenced as a first photosensitive element and a second photosensitive element. It will be appreciated that the terms "first" and "second" as used herein include references to two or more than two. The terms "first" and "second" are used herein to merely distinguish one element from another element in describing various elements e.g. two or more than two elements. For example, a group may include 9 photosensitive elements in 3×3 or other configurations under one lens or may include 25 photosensitive elements in 5×5 or other configurations under one lens. Image signal from every one of the photosensitive elements may be collected and then processed to create images for multiple planes in the scintillator as will be described in greater detail below. Further, the use of the terms "first element" and "second element" in a group should not be construed as in any particular order.

Each of the plurality of lenses 408 may be configured to focus at each one of the multiple photosensitive elements 410 in a corresponding group at the same time. As shown in 3A and 3B, each photosensitive element may have a unique optical path through the scintillator layer. Optical paths defined by first photosensitive elements of the plurality of groups may converge at a virtual pixel in a first plane in the scintillator layer 402. For example, photosensitive elements 2, 5, 9, 13 and 16 in FIG. 3A may have optical paths converging at virtual pixel 411 in the first plane 412. Optical paths defined by second photosensitive elements of the plurality of groups may converge at a virtual pixel in a second plane in the scintillator layer 402. For example, photosensitive elements 1, 4, 9, 14 and 17 in FIG. 3B may have optical paths converging at virtual pixel 413 in the second plane 414. Image processing after reading out all of the photosensitive elements will use the information from all of the photo sensors to reconstruct the images at the different planes of the scintillator. The photo sensors are exposed at the same time with a single X-ray pulse.

The x-ray imager shown in FIGS. 3A and 3B can be advantageously used in multi-energy imaging. In conventional multi-energy imaging, multiple x-ray exposures with multiple energies are used. For example, in a conventional multi-energy imaging, a first image signal is generated using a first pulse of x-rays having a first energy, and a second image signal is generated using a second pulse of x-rays having a second energy. A third image may be reconstructed using the first and second image signals. With embodiments of the x-ray image device provided by this disclosure, a multi-energy imaging can be performed by using a single pulse of x-rays.

The x-ray imager provided in this disclosure can collect and detect light from different depths in the scintillator and generate corresponding images after image post-processing. Because of the depth-dependence of x-ray absorption in the scintillator layer described above, each such image will correspond to a different part of the x-ray energy spectrum. For example, more of the lower energy x-ray photons of the x-ray pulse are stopped closer to the entrance surface of the scintillator and interact with it to produce light. Higher energy x-ray photons travel deeper and relatively more of them deposit their energies closer to the exit surface of the scintillator and interact with it to produce light. By collecting light from different depths of the same scintillator and creating corresponding images, energy dependent x-ray imaging can be performed using a single x-ray exposure. Images of more than two planes of the scintillator may be reconstructed by image post processing.

To extract data to form such an image at a given depth, a method called tomographic synthesis may be used. Originally tomosynthesis is used for creating 3D x-ray images. It is a method in which x-ray images are obtained by moving the x-ray source in a fixed 2D plane or short arc. By mathematically shifting and adding the data, images of different parallel planes in the object can be created. The disclosure applies this mathematical principle to the light generated at different depths from the original single x-ray exposure. The distinction to be noted is that the x-ray source is not moved and no 3D image of the object is generated. FIGS. 3A-3B schematically show how by selecting and combining data from different photosensitive elements, images from different depths of the scintillator can be created. For example, by combining photosensitive elements 2, 5, 9, 13 and 16, the data from light near the x-ray entrance surface of the scintillator 402 can be used to form the image (FIG. 3A) while data from photosensitive elements 1, 4, 9, 14 and 17 can be used to form the image of the x-ray hitting the exit end of the scintillator 402 (FIG. 3B). Accordingly, one aspect of this disclosure provides a method of acquiring x-ray images using a single pulse of x-rays. The x-rays may have an energy spectrum including a first energy portion and a second energy portion. The terms "first" and "second" are used herein for ease of description of the embodiments. The x-ray energy spectrum may have more than two portions and there might be more than two planes of the scintillator corresponding to more than two energy portions. Because x-rays of different energies stop at different locations in the scintillator layer and interact with the scintillator, light may be generated in a first plane of the scintillator predominantly from x-rays of the first energy portion and in a second plane of the scintillator layer predominantly from x-rays of the second energy portion. Light generated in the first plane of the scintillator and light generated in the second plane of the scintillator are collected by the lens array respectively. As described above, one embodiment of the disclosed detector array may comprise a plurality of groups of photosensitive elements, each group comprising at least a first photosensitive element and a second photosensitive element. The lens array may comprise a plurality of lenses, each lens covering one of the plurality of groups of photosensitive elements. A first photosensitive element in each group may have a first optical path through the scintillator layer and a second photosensitive element in each group may have a second optical path through the scintillator layer. A first and a second photosensitive elements in the plurality of groups can be arranged such that the optical paths defined by the plurality of first photosensitive elements in the plurality of groups may converge in the first plane in the scintillator layer and the optical paths defined by the plurality of second photosensitive elements in the plurality of groups may converge in the second plane in the scintillator layer. In the post image processing, a first image may be constructed by using data from the plurality of first photosensitive elements of the plurality of groups. A second image may be constructed by using data from the plurality of second photosensitive elements of the plurality of groups. A third image may be computed from the first and second images by using algorithms known in the art.

Exemplary embodiments of an imaging device and an imaging method are described. Those skilled in the art will appreciate that various modifications may be made within the spirit and scope of the disclosure. All these or other variations and modifications are contemplated by the inventors and within the scope of the disclosure.

The invention claimed is:

1. An x-ray imager, comprising:
    a scintillator layer configured to generate light from x-rays, wherein the scintillator layer is transparent, and made from a scintillator that is non-structured and non-pixellated;
    a detector array comprising a plurality of photosensitive elements configured to detect light generated in the scintillator layer; and a lens array, wherein the lens array comprises a plurality of lenses, each being configured to collect light and focus the collected light to only one of the plurality of photosensitive elements.

2. The x-ray imager of claim 1 wherein each of the lenses comprises an anti-reflective coating.

3. The x-ray imager of claim 1 wherein the lens array is attached to the scintillator layer.

4. The x-ray imager of claim 1 wherein the lens array is attached to the detector array.

5. The x-ray imager of claim 1 wherein the lens array is attached to the scintillator layer and the detector array.

6. The x-ray imager of claim 1 wherein the lens array comprises multiple lens layers.

7. The x-ray imager of claim 1 wherein each lens has a size substantially greater than a size of a photosensitive element covered by the lens.

8. The x-ray imager of claim 1 wherein the lens array comprises a fill factor greater than 90%.

9. The x-ray imager of claim 1 wherein the scintillator layer, the detector array, and the lens array are arranged in a configuration such that in use x-rays traverse the detector array before propagating in the scintillator layer.

10. The x-ray imager of claim 1 wherein the scintillator layer, the detector array, and the lens array are arranged in a configuration such that in use x-rays are incident on the scintillator layer before propagating in the detector array.

11. The x-ray imager of claim 1 wherein the detector array further comprises a plurality of light blockers each being situated between adjacent photosensitive elements.

12. The x-ray imager of claim 1 wherein the scintillator comprises a first surface proximal to the lens array, a second surface distal to the lens array, and side surfaces, wherein the first surface is polished.

13. The x-ray imager of claim 12 wherein the second surface is covered with a reflective coating and the side surfaces are covered with a light absorbing material.

14. The x-ray imager of claim 1 wherein the scintillator comprises a first surface proximal to the lens array, a second surface distal to the lens array, and side surfaces, wherein the first surface is covered with an antireflective coating.

15. The x-ray imager of claim 14 wherein the second surface and side surfaces are covered with an antireflective coating.

16. The x-ray imager of claim 1 further comprising an opaque mask situated between the lens array and the detector array, wherein the mask comprises a plurality of transparent areas each being positioned in front of a corresponding photosensitive element.

17. The x-ray imager of claim 1 wherein the scintillator layer has an exterior surface, wherein the entire exterior surface except for a side facing the detector array is coated by a light absorbing material.

18. An x-ray imager, comprising:
a scintillator layer configured to generate light from x-rays; and
a detector array comprising a plurality of photosensitive elements configured to detect light generated in the scintillator layer; wherein:
the scintillator layer is transparent, and made from a scintillator that is non-structured and non-pixellated; and
the scintillator layer has a first surface proximal to the detector array, the first surface of the scintillator layer is curved in a plurality of portions each portion having a curved surface facing toward one of the plurality of photosensitive elements and a focal length configured to collect light and focus the collect light to the one of the plurality of photosensitive elements.

19. The x-ray imager of claim 18 wherein each of the plurality of portions of the first surface of the scintillator layer has a convex surface pointing toward the one of the plurality of the photosensitive elements.

20. The x-ray imager of claim 19 wherein each of the plurality of portions of the first surface of the scintillator layer has a concave surface facing the one of the plurality of the photosensitive elements.

21. An x-ray imager, comprising:
a scintillator layer configured to generate light from x-rays, wherein the scintillator layer is transparent, and made from a scintillator that is non-structured and non-pixellated;
a detector array configured to detect light generated in the scintillator layer, wherein the detector array comprises a plurality of groups of photosensitive elements, each group comprising at least a first photosensitive element and a second photosensitive element; and
a lens array situated between the scintillator layer and the detector array, wherein the lens array comprises a plurality of lenses, each lens covering one of the plurality of groups of photosensitive elements,
wherein the first photosensitive element in each group has a first optical path through the scintillator through the lens covering the group, and the second photosensitive element in each group has a second optical path through the scintillator through the lens covering the group; and
optical paths of the plurality of first photosensitive elements in the plurality of groups converge in a first plane in the scintillator layer, and optical paths of the plurality of second photosensitive elements in the plurality of groups converge in a second plane in the scintillator layer.

22. The x-ray imager of claim 21 wherein each group of photosensitive elements comprises more than two photosensitive elements each having an optical path through the scintillator, and optical paths of the more than two photosensitive elements of the plurality of groups converge in two or more than two planes respectively in the scintillator layer.

23. The x-ray imager of claim 21 wherein the scintillator layer, the detector array, and the lens array are arranged in a configuration such that x-rays traverse the detector array before propagating in the scintillator layer.

24. The x-ray imager of claim 21 wherein the scintillator layer, the detector array, and the lens array are arranged in a configuration such that x-rays are incident on the scintillator layer before propagating in the detector array.

25. A method of acquiring x-ray images, comprising:
receiving x-rays having an energy spectrum including a first energy portion and a second energy portion by an x-ray imager comprising a scintillator layer, a lens array and a detector array, thereby light is generated in the scintillator in a first plane and in a second plane, wherein
the detector array comprises a plurality of groups of photosensitive elements, each group comprising at least a first photosensitive element and a second photosensitive element; and the lens array comprises a plurality of lenses each lens covering one of the plurality of groups of photosensitive elements;
the first photosensitive element in each group has a first optical path through the scintillator through the lens covering the group, the second photosensitive element in each group has a second optical path through the scintillator through the lens covering the group, and optical paths of the plurality of first photosensitive elements in the plurality of groups converge in a first plane in the scintillator layer, and optical paths of the plurality of second photosensitive elements in the plurality of groups converge in a second plane in the scintillator layer;

collecting image signals using the detector array;

constructing a first image pixel using data from the plurality of first photosensitive elements of the plurality of groups.

26. The method of claim 25 further comprising the step of constructing a second image pixel using data from the plurality of second photosensitive elements of the plurality of groups.

27. The method of claim 26 further comprising the step of computing a third image pixel using the constructed first and second image pixels.

28. The method of claim 27 wherein the x-rays received by the x-ray imager is in a single pulse.

29. The method of claim 25 wherein each group of photosensitive elements comprises more than two photosensitive elements each having an optical path through the scintillator, and optical paths of the more than two photosensitive elements of the plurality of groups converge in two or more than two planes respectively in the scintillator layer.

* * * * *